(No Model.)

E. SUTHERLAND.
MACHINE FOR SEEDING RAISINS.

No. 575,181. Patented Jan. 12, 1897.

WITNESSES:
E. J. Griswold
J. C. Connor

INVENTOR
Eugene Sutherland
BY
Howson and Howson
his ATTORNEYS

United States Patent Office.

EUGENE SUTHERLAND, OF JERSEY CITY, NEW JERSEY.

MACHINE FOR SEEDING RAISINS.

SPECIFICATION forming part of Letters Patent No. 575,181, dated January 12, 1897.

Application filed December 2, 1895. Serial No. 570,788. (No model.)

*To all whom it may concern:*

Be it known that I, EUGENE SUTHERLAND, a citizen of the United States, and a resident of Jersey City, Hudson county, State of New Jersey, have invented a Machine for Seeding Raisins, &c., of which the following is a specification.

My invention relates to that class of apparatus or machines for removing the seeds from raisins and other similar dried fruit which operate by impaling the fruit upon pins placed so closely together upon a rotating cylinder that while the pulp of the fruit is forced upon the pins the seeds are thrust by the pins through the skins of the fruit, and these seeds are then removed by a scraper, after which the impaled and seeded fruit is taken off from the pins and carried into a receptacle separate from the removed seeds. An early example of a machine of this character is illustrated in the patent to Crosby, No. 56,721, July 31, 1866.

The object of my invention is to so construct a simple machine of this character as to facilitate the freeing of the fruit from the seeds and the removal of the seeded fruit from the pin-cylinder with the least possible injury or waste of the fruit.

Figure 1:
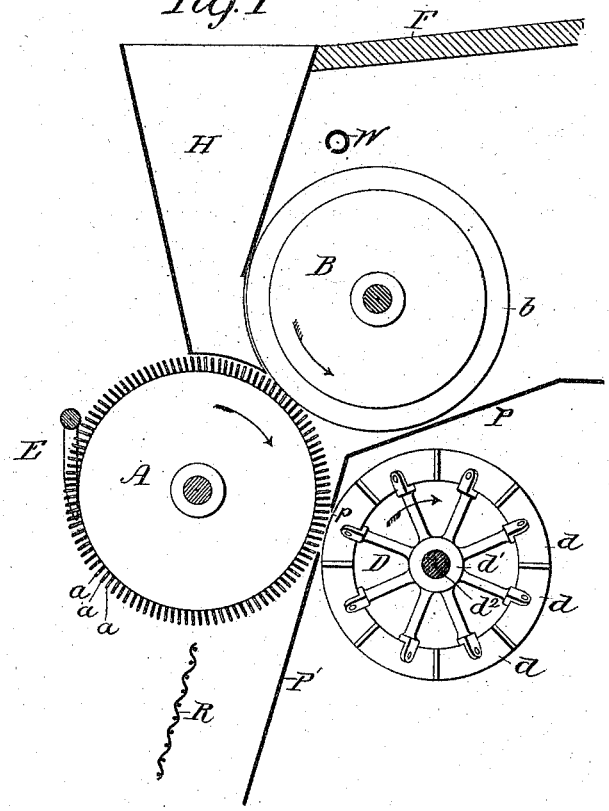
Figure 2:
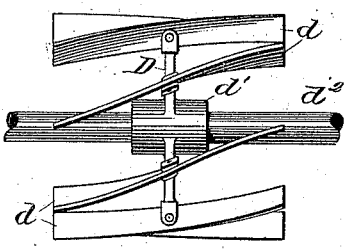

In the accompanying drawings, Figure 1 is a vertical section of sufficient of the operative parts of my machine to illustrate my invention, and Fig. 2 is a detached view of the rotary scraper for removing the seeds.

As in the Crosby machine, the essential elements in my machine are the pin-cylinder A, to which rotary motion may be imparted by any suitable means, the presser-drum B, rotating at the same surface-speed as the pin-cylinder and in contact with the ends of the pins, a scraper for removing the seeds, and a series of blades E, lying between the rows of pins on the cylinder, to detach the seeded and impaled fruit from the pins.

The presser-cylinder B is preferably arranged in relation to the pin-cylinder as shown in Fig. 1, and above the two there is provided a hopper H, with a feed-table F, over which the operator can supply raisins or other dried fruit in proper quantity to drop through the hopper onto the pin-cylinder, which is driven in the direction of the arrow. The presser-roll B, which is to cause the impalement of the fruit upon the pins of the cylinder A and which is rotated in the direction of the arrow by surface-contact with the pin-cylinder or otherwise, has a surface $b$ of rubber.

In the Crosby machine before referred to the scraper consisted of a stationary blade adjacent to the periphery of the pin-cylinder and below the presser-roll. In my machine I provide a scraper in similar relation to the pin-cylinder and presser-roll, but I make it a rotary scraper D. I prefer to construct this rotary scraper of a series of blades $d$, mounted upon a hub or hubs $d'$ upon a rotating shaft $d^2$. I set these blades at an angle to the axis of the scraper or slightly spirally, as illustrated in the drawings, and I impart to the scraper a rotary motion, rapid relatively to the speed of the pin-cylinder, so as to scrape off from the pin-cylinder and project to a distance the seeds which have been forced by the pins through the fruit. The rapid rotary motion of the scraper and the inclination of the blades will tend to prevent their becoming clogged.

In order to facilitate the removal of the seeded fruit from the pins $a$ of the cylinder A by the blades E, which are arranged between the rows of pins upon the cylinder A, and also to avoid, so far as possible, tearing and waste of the fruit in removing it from such pins, I arrange the latter at a slight angle to the radial lines on which they have been heretofore arranged, this angle being in a direction backward from such radial lines, considering the direction in which the cylinder rotates. This can be seen on reference to Fig. 1.

Between the rotary scraping-plates and the presser-drum I arrange a partition P, and also between the rotary scraper and the pin-cylinder I arrange a partition P', which may form a continuation of the partition P. In the partition P', however, there is provided an opening $p$, through which the rotary scraper may reach and remove the projected seeds.

Over the presser-cylinder B there may be provided a perforated water-pipe W for moistening purposes. If much water is used, I prefer to employ a reticulated or perforated screen R in front of the lower part of the partition $p'$, so as to thus provide for the convenient carrying off of the water, while the seeded fruit passes down over the reticulated screen into its proper receptacle more or less freed from the water.

I claim as my invention—

1. In a machine for removing seeds from raisins, the combination of a rotary pin-cylinder and a presser-roll to impale the fruit upon the pins with rotary scraper-blades to remove the projected seeds.

2. In a machine for removing seeds from raisins and other such fruit, the combination of a rotary pin-cylinder, and a presser-roll to impale the fruit upon the pins, with rotary scraper-blades set at an angle or spirally, to remove the projected seeds.

3. In a machine for removing seeds from raisins and other such fruit, the combination of a pin-cylinder having the pins set at an angle backward from radial lines, with means for impaling the fruit upon the pins, means for removing the projected seeds, and blades lying between the rows of pins, to remove therefrom the seeded fruit, all substantially as described.

In testimony whereof I have signed my name to this specification in the presence of two subscribing witnesses.

EUGENE SUTHERLAND.

Witnesses:
HENRY KEYSER,
JOHN W. VICKERS.